United States Patent [19]

Hodakowski et al.

[11] 4,118,405

[45] Oct. 3, 1978

[54] METHOD OF PRODUCING AN ACYLATED DERIVATIVE OF AN EPOXY FATTY ACID ESTER OR EPOXY NATURAL OIL

[75] Inventors: Leonard Edward Hodakowski, Saint Albans; Lawrence George Hess, Charleston, both of W. Va.

[73] Assignee: Union Carbide Corporation, NewYork, N.Y.

[21] Appl. No.: 816,465

[22] Filed: Jul. 18, 1977

[51] Int. Cl.² ........................... C09F 5/00; C11C 3/00
[52] U.S. Cl. .............................. 260/405; 260/23 EP; 260/23 AR
[58] Field of Search .............. 260/405, 23 EP, 23 AR

[56] References Cited

U.S. PATENT DOCUMENTS

| | | | |
|---|---|---|---|
| 2,993,920 | 7/1961 | Budde et al. | 260/23 EP |
| 3,125,592 | 3/1964 | Nevin | 260/405 |
| 3,224,989 | 12/1965 | Nevin | 260/23 EP |
| 3,879,320 | 4/1975 | Mathai et al. | 260/23 EP |

*Primary Examiner*—Winston A. Douglas
*Assistant Examiner*—John F. Niebling
*Attorney, Agent, or Firm*—Donald M. Papuga

[57] ABSTRACT

An improved method of producing an acylated derivative of an epoxy fatty acid ester or epoxy natural oil, by reacting the epoxy fatty acid ester or epoxy natural oil with a vinyl aliphatic monocarboxylic acid in contact with a catalyst, a polymerization inhibitor and gaseous oxygen, the improvement of adding the monocarboxylic acid, or the acylation catalyst or a mixture of the monocarboxylic acid and the acylation catalyst, to a reaction mixture at an elevated temperature and maintaining an elevated temperature until completion of the reaction.

14 Claims, No Drawings

METHOD OF PRODUCING AN ACYLATED DERIVATIVE OF AN EPOXY FATTY ACID ESTER OR EPOXY NATURAL OIL

BACKGROUND OF THE INVENTION

1. Field of the Invention

This invention relates to an improved method of producing an acylated derivative of an epoxy fatty acid ester or epoxy natural oil having aliphatic chains of 10 to 24 carbon atoms, and including at least one oxirane segment per molecule, by reacting the epoxy fatty acid ester or epoxy natural oil with a vinyl aliphatic monocarboxylic acid in contact with an acylation catalyst, a polymerization inhibitor and gaseous oxygen, the improvement comprising adding said monocarboxylic acid or said acylation catalyst or a mixture of said monocarboxylic acid and said acylation catalyst to a reaction mixture at an elevated temperature and maintaining an elevated temperature until completion of the reaction.

2. Description of the Prior Art

U.S. Pat. No. 3,125,592 discloses the preparation of polymerizable long chain natural oil and fatty acid ester compounds having vicinal acryloxy and hydroxyl groups. The method disclosed involves mixing an epoxidized derivative of a fatty ester or natural oil, a vinyl aliphatic monocarboxylic acid, a phenolic free radical inhibitor and gaseous oxygen inhibitor with an acylation catalyst at room temperature. The reactants are then heated up to the reaction temperature of 75° to 175° C. and maintained at an elevated temperature until completion of the reaction.

It has been found that the compounds as disclosed in U.S. Pat. No. 3,125,592 are particularly useful as substituents of so-called "100 percent solids" radiation curable coatings and inks, which contain essentially no volatile solvents, are comprised of one or more of the aforesaid compounds, and photoinitiators, and they polymerize upon exposure to radiation to form solid coatings or inks. Such coatings and inks are advantageous to use, since curing them does not require the use of conventional heating equipment, and the associated release of volatile solvents into the atmosphere, yet they can be applied to substrates using conventional liquid film application methods. However, one of the main problems associated with the use of compounds as disclosed in U.S. Pat. No. 3,125,592 is that they typically have high viscosities, which makes them difficult to handle and to formulate with other ingredients in the preparation of inks and coatings. If the viscosity of these compounds could be lowered, this would facilitate variation of the composition of the coatings or inks.

SUMMARY OF THE INVENTION

It has now been found that low viscosity acylated derivatives of an epoxy fatty acid ester or epoxy natural oil having aliphatic chains of 10 to 24 carbon atoms and including at least one oxirane segment per molecule, may be produced by the following improved method. This method involves reacting the epoxy fatty acid ester or epoxy natural oil with a vinyl aliphatic monocarboxylic acid, such as acrylic acid or methacrylic acid, in contact with 0.10 to 5.0 parts of an acylation catalyst, per 100 parts of reaction mixture, a polymerization inhibitor and gaseous oxygen and the improvement therein comprises:

(A) the addition of said monocarboxylic acid to a reaction mixture comprising the epoxy fatty acid ester or epoxy natural oil, acylation catalyst, polymerization inhibitor and gaseous oxygen; or (B) the addition of said acylation catalyst to a reaction mixture comprising the epoxy fatty acid ester or epoxy natural oil, monocarboxylic acid, polymerization inhibitor and gaseous oxygen; or (C) the addition of a mixture of said monocarboxylic acid and said acylation catalyst to a reaction mixture comprising the epoxy fatty acid ester or epoxy natural oil, polymerization inhibitor and gaseous oxygen, said addition having been made at a temperature of from about 100° C. to about 125° C., and maintaining the reaction temperature from about 105° C. to about 130° C. for a period of time sufficient to complete the acylation reaction.

By use of the method of this invention, the viscosity of the products, the acylated derivatives of epoxy fatty acid esters or epoxy natural oils is lower than that which would normally be obtainable by the previously disclosed prior art methods. Another advantage of the improved method of the present invention is that the lower viscosity product has a better shelf stability, since the inhibitors conventionally used in acrylate systems need oxygen to function effectively and lower viscosity material allows the oxygen to permeate the system easier.

DESCRIPTION OF THE PREFERRED EMBODIMENTS

The acylated derivatives of epoxy fatty acid esters or epoxy natural oils having aliphatic chains of 10 to 24 carbon atoms and including at least one oxirane segment per molecule, are known in the art and are described in U.S. Pat No. 3,125,592 which is incorporated herein by reference. The long chain epoxy natural oils, or fatty acids, suitable for use herein are those which may be readily produced from the natural unsaturated vegetable and animal oils by conventional epoxidation methods. Illustrative examples include epoxidized soybean oil, epoxidized corn oil, epoxidized castor oil, epoxidized cottonseed oil, epoxidized hempseed oil, epoxidized safflower oil, epoxidized peanut oil, epoxidized linseed oil, epoxidized olive oil, etc. Additionally, the long chain epoxy fatty acid esters are derived by known method from the natural unsaturated vegetable and animal oils. These epoxidized fatty acid esters include the methyl ester of 9, 10 — epoxystearic acid, the 2 — ethylhexyl ester of 9, 10, 12, 13 — diepoxystearic acid, the phenyl ester of 5, 6 — epoxycapric acid, epoxidized tall oil fatty acid esters, etc.

The vinyl aliphatic monocarboxylic acids which are used herein are characterized by the following formula:

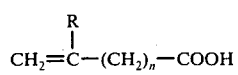

$$CH_2 = \overset{R}{\underset{|}{C}} - (CH_2)_n - COOH$$

wherein R is hydrogen or an alkyl group of 1 to 4 carbon atoms and $n$ is an integer ranging from 0 to 2. The preferred acids herein are acrylic acid and methacrylic acid.

Any of the known acylation catalysts can be used in the reaction of the present invention. Illustrative acylation catalysts include alkali metal acrylates, quaternary ammonium hydroxides, alkali metal hydroxides, imidazoles and tertiary amines such as pyridine, tributylamine, and triethylenediamine, for example. The catalyst is used in an amount of from 0.10 to about 5.0 parts of catalyst per 100 parts of reaction mixture, preferably from 0.5 to 1.5 parts of catalyst per 100 parts of reaction mixture.

The polymerization inhibitors used herein comprise a family of inhibitors well known to those skilled in the art and are set forth in U.S. Pat. No. 3,125,592, for example. The preferred inhibitors are phenolic compounds. Paramethoxyphenol and hydroquinone are the preferred species. Other polymerization inhibitors include substances such as benzoquinone, naphthoquinone and di(tertiary butyl) cresol. The polymerization inhibitor is used in amounts of from 0.01 percent to about 0.25 percent by weight, and preferably from 0.05 percent to 0.20 percent by weight.

Gaseous oxygen is used in combination with the polymerization inhibitor to further inhibit vinyl polymerization. Contact between the liquid reaction mixture and the oxygen, or oxygen-containing gas, e.g., air, should be maintained during the acylation reaction. This may be accomplished by methods known in the art and as set forth in U.S. Pat. No. 3,125,592.

The improved method of the present invention is carried out by one of the following methods:

(A) an epoxy fatty acid ester or epoxy natural oil, acylation catalyst, polymerization inhibitor and gaseous oxygen are charged to a reactor, and heated from a temperature of about 100° C. to about 125° C., preferably from about 105° C. to about 130° C. A vinyl aliphatic monocarboxylic acid is added to the reaction mixture at this elevated temperature and the temperature is then maintained at from about 105° C. to about 130° C. for a period of time sufficient to complete the reaction; or (B) the acylation catalyst is added to a reaction mixture of the epoxy fatty acid ester or epoxy natural oil, vinyl aliphatic monocarboxylic acid, polymerization inhibitor and gaseous oxygen, at the aforesaid elevated reaction temperatures, and the temperature maintained at from about 105° C. to about 130° C. until completion of the reaction; or (C) a mixture of the vinyl aliphatic monocarboxylic acid and acylation catalyst are added to a reaction mixture of an epoxy fatty acid ester or epoxy natural oil, polymerization inhibitor and gaseous oxygen, at the aforesaid elevated reaction temperature, and the temperature maintained at from about 105° C. to about 130° C. until completion of the reaction.

Further, the epoxy fatty acid ester or epoxy natural oil, acylation catalyst, polymerization inhibitor and gaseous oxygen may be charged to a reactor, and the entire reaction mixture rapidly heated to a temperature of from about 105° C. to about 130° C. (in about 10 minutes, as compared to a time of 60 minutes of the prior art) and maintained there until completion of the reaction. The concentration of the acylation catalyst may be from about 0.10 to about 5 parts of catalyst per 100 parts of reaction mixture, preferably from 0.30 to 1.5 parts of catalyst per 100 parts of reaction mixture.

The use of any of these methods as well as increased concentration of the acylation catalyst lowers the viscosity of the product, as compared to the prior art method of adding all of the components to a reactor, then heating these up slowly to the reaction temperature and maintaining an elevated temperature until completion of the reaction.

The acylated derivative of an epoxy fatty acid ester or epoxy natural oil, as described herein, may be prepared by continuous or bulk methods.

Typically, the products of the reaction of this invention are inhibited to prevent polymerization of the acrylate group. This may be accomplished by the addition of a variety of polymerization inhibitors, known in the art, to the product. A combination of hydroquinone and phosphite, especially triphenyl phosphite, has been found particularly effective in preventing polymerization of the acrylate group.

EXAMPLES

The following examples are merely illustrative of the present invention and are not intended as a limitation on the scope thereof.

CONTROL A

Linseed oil epoxide (80.27 weight percent) and having an oxirane content of about 9.3% by weight, glacial acrylic acid (18.50 weight percent), monomethyl ether of hydroquinone (0.088 weight percent), and potassium hydroxide in water (0.93 weight percent of a 47.5 percent solution) were charged to a reactor. The mixture was stirred and heated to 110° C. over a 105 minute period and then maintained between 110° C. and 115° C., until completion of the reaction. As the reaction cooled, hydroquinone (0.0096 weight percent) and triphenyl phosphite (0.11 weight percent) were added as inhibitors. The viscosity of the acrylated linseed oil derivative produced was 22,000 centistokes at 100° F. (using a Cannon-Fenske viscometer) or 177,000 centipoises at 23° C. (using a Brookfield viscometer). The measured free acrylic acid at the end of the reaction was 0.55 weight percent.

CONTROL B

The following materials were charged to a reactor: 241 grams of linseed oil epoxide (having an oxirane content as in Control A), 55.5 grams of glacial acrylic acid, 0.26 grams of the monomethyl ether of hydroquinone, 1.4 grams of potassium hydroxide and 1.4 milliliters of water. The mixture was heated from room temperature (30° C.) to a reaction temperature (110° C.) over a 25 minute period and stirred at 110° C. to 120° C. for 4 hours. The viscosity of the acrylated linseed oil derivative produced was 22,439 centistokes at 100° F. (using a Cannon-Fenske viscometer). The measured free acrylic acid at the end of the reaction was 0.56 weight percent.

EXAMPLE 1

Linseed oil epoxide (241.1 grams) and having an oxirane content as in Control A, glacial acrylic acid (55.5 grams) and monomethyl ether of hydroquinone (0.264 grams) were charged to a one-liter four-neck round-bottom flask equipped with a mechanical stirrer, thermometer, reflux condenser and sparging tube at room temperature and under an air purge. The contents were heated to 100° C. over a 65 minute period, at which time a catalyst solution of potassium hydroxide in water (2.77 grams each) was added. The reaction was stirred at about 100° C. to 115° C. for 2½ hours, at the end of which time the residual acid had dropped to 0.31 weight percent. The viscosity of the acrylated linseed oil derivative produced was 76,000 centipoises at 24° C. (using a Brookfield viscometer).

EXAMPLE 2

Linseed oil epoxide (241 grams) and having an oxirane content as in Control A, glacial acrylic acid (55.5 grams), monomethyl ether of hydroquinone (0.26 grams) and a solution of potassium hydroxide in water (2.77 grams each) were charged to a one-liter four-neck round-bottom flask equipped with a mechanical stirrer, thermometer, reflux condenser and sparging tube, at room temperature under an air purge. The contents were heated to 110° C. over a 30 minute period and then maintained between 110° C. and 115° C. for an additional 2 hours and 25 minutes, at which time the residual acrylic acid was 0.57 weight percent. The viscosity of the acrylated linseed oil derivative produced was 9,834 centistokes at 100° F. (using a Cannon-Fenske viscometer).

EXAMPLE 3

Example 2 was exactly repeated. The residual acrylic acid was 0.44 weight percent. The viscosity of the acrylated linseed oil derivative produced was 11,175 centistokes at 100° F. (using a Cannon-Fenske viscometer).

EXAMPLE 4

Linseed oil epoxide (241 grams) and having an oxirane content as in Control A, glacial acrylic acid (55.5 grams), monomethyl ether of hydroquinone (0.26 grams) were charged to a one-liter four-neck round-bottom flask equipped with a mechanical stirrer, thermometer, reflux condenser and sparging tube at room temperature under an air purge. The contents were heated to 110° C. over a 35 minute period, at which time a catalyst solution of potassium hydroxide in water (2.77 grams each) was added. The reaction was maintained between 110° C. and 115° C. for about 3½ hours, at the end of which time the residual acrylic acid had dropped to 0.34 weight percent. The viscosity of the acrylated linseed oil derivative produced was 15,833 centistokes at 100° F. (using a Cannon-Fenske viscometer).

EXAMPLES 5 to 9

These examples illustrate a continuous process for the production of an acrylated linseed oil derivative.

The reaction system comprises three stirred-tank reactors operated in series at 110° C., 120° C., and 120° C., respectively. One-liter, round-bottom flasks were used as the stirred-tank reactors. They were fitted with a thermometer, an inlet feed line under the surface of the liquid, a glass stirrer and an outlet line on the side giving a 400 milliliter liquid holdup. The feed mixture comprising a mixture of linseed oil epoxide, having an oxirane content as in Control A, and glacial acrylic acid in a weight ratio of 4.34 to 1,900 parts per million of monomethyl ether of hydroquinone and 1.0 percent potassium hydroxide (potassium hydroxide, 47.5 percent aqueous solution), was pumped into the first reactor in the series, with the mixture flowing by gravity through the side arm into the next reactor in the series. The reaction mixture was maintained at the desired temperature by regulation of heat supplied to each by Glascol ® mantles. A constant air sparge was introduced, separate from the liquid feed, below the liquid level of the first reactor and was carried into the next reactor with the reaction mixture. All of the stirred-tank reactors were closed systems, i.e., pressure buildup from the air sparge was relieved by outflow of the gas with the product from the final reactor in the series.

The feed rate of the reactants (ml./hr.), the total residence time (hours), the temperature of each reactor, the product acidity (weight percent acrylic acid) and product viscosity (centistokes at 100° F. using a Cannon-Fenske viscometer) are given in Table I.

TABLE I

| Example | Feed Rate (ml/hr) | Time (hrs.) Each Reactor | Time (hrs.) Total | Temperature (° C) Reactor 1 | 2 | 3 | Product Properties Acidity (% acrylic acid) | Product Properties Viscosity (cks, 100° F) |
| --- | --- | --- | --- | --- | --- | --- | --- | --- |
| 5 | 245 | 1.63 | 4.9 | 110 | 120 | 120 | 0.72 | 13,052 |
| 6 | 230 | 1.74 | 5.2 | 110 | 120 | 120 | 0.61 | 12,744 |
| 7 | 240 | 1.67 | 5.0 | 110 | 120 | 120 | 0.79 | 12,962 |
| 8 | 280 | 1.42 | 4.3 | 110 | 120 | 120 | 0.79 | 12,105 |
| 9 | 295 | 1.35 | 4.1 | 110 | 120 | 120 | 0.70 | 14,185 |

EXAMPLE 10

A reactor was charged with linseed oil epoxide (402 grams), having an oxirane content as in Control A, monomethyl ether of hydroquinone (0.45 grams) and 4.6 grams of 47.5 percent aqueous potassium hydroxide with air sparge. The contents were heated to a temperature of 105° C., at which time a total of 94 grams of glacial acrylic acid was added. During the acrylic acid feed, the temperature was maintained at 105° C. to 110° C. for 0.25 hours and then at 110° C. for an additional 1.75 hours. The mixture was heated an additional 3.25 hours at 110° C. after all of the acrylic acid had been added. The acrylated linseed oil derivative produced had an acrylic acid content of 0.53 weight percent and a Cannon-Fenske viscosity at 100° F. of 14,851 centistokes.

As can be seen from the Examples, the acrylated linseed oil derivatives prepared by the methods of the present invention (Examples 1 to 10) have a lower viscosity than those prepared by the methods of the prior art (Controls A and B). Specifically, Controls A and B demonstrate the prior art method of adding and mixing all of the ingredients at room temperature and then heating these up to the reaction temperature and maintaining an elevated temperature until completion of the reaction. The viscosities of the acrylated linseed oil derivatives were 22,000 centistokes at 100° F. or 177,000 centipoises at 23° C. (Control A) and 22,439 centistokes at 100° F. (Control B).

The viscosity of the acrylated linseed oil derivative, produced by a method of the present invention, i.e., adding a catalyst solution at 100° C., was 76,000 centipoises at 24° C. (Example 1). Examples 2 and 3 demonstrate that heating the reactants over a 30 minute period with twice as much catalyst as Control B, results in a product viscosity of 9,834 and 11,175 centistokes, respectively, at 100° F. Example 4 demonstrates that adding a catalyst at 110° C. produces a product with a viscosity of 15,833 centistokes at 100° F. Examples 5 to 9 demonstrate that a continuous method of producing an acrylated linseed oil derivative, by adding all of the ingredients at 110° C., produces products with viscosities ranging from 12,105 to 14,185 centistokes at 100° F. Lastly, Example 10 shows that addition of acrylic acid at temperatures of 105° C. to 110° C. produces a product with a viscosity of 14,851 centistokes at 100° F.

EXAMPLES 11 to 20

A series of experiments were carried out to demonstrate the criticality of temperature during addition of acrylic acid in lowering the viscosity of the final product. The procedure followed was similar to that of Example 10, in which 94 grams of acrylic acid was added at different temperatures to a reactor charged with linseed oil epoxide (402 grams), having an oxirane content as in Control A, monomethyl ether of hydroquinone (0.45 grams), 4.6 grams of 47.5 percent aqueous potassium hydroxide (Control C and Examples 11 to 18) or 6.5 grms of 35 percent methanolic benzyltrimethylammonium hydroxide (Examples 19 and 20) with air sparge. Thereafter, the mixture was heated and the viscosity of the product determined (Cannon-Fenske viscometer). The experiments were standardized to provide results at an acidity of 0.53 weight percent acrylic acid. The temperature at which the acrylic acid was added, the time in hours during which it was added, the temperature and time at which the reaction was completed and the viscosity of the acrylated linseed oil epoxide produced, is summarized in Table II.

TABLE II

| Example | Acrylic Acid Feed Temp. (° C) | Acrylic Acid Feed Time (hrs.) | Reaction Completion Temp. (° C) | Reaction Completion Time (hrs.) | Viscosity cks, 100° F |
|---|---|---|---|---|---|
| Control C | 27 | 0.25 | 110 | 3.5 | 22,582 |
| 11 | 90 | 2.0 | 110 | 4.0 | 21,937 |
| 12 | 95 | 2.0 | 110 | 4.0 | 23,018 |
| 13 | 95 | 2.0 | 110 | 3.0 | 20,154 |
| 14 | 100 | 2.0 | 100 | 6.0 | 16,894 |
| 15 | 105 | 2.0 | 105 | 4.25 | 16,894 |
| 16 | 100 | 2.0 | 110 | 2.5 | 15,600 |
| 17 | 110 | 2.0 | 110 | 3.25 | 15,000 |
| 18 | 110 | 2.0 | 110 | 3.0 | 13,950 |
| 19 | 110 | 2.0 | 110 | 3.5 | 11,600 |
| 20 | 110 | 4.0 | 110 | 3.5 | 12,500 |

This data further substantiates that of Examples 1 to 10 and shows the production of lower viscosity product when the acrylic acid is introduced into the reaction at a temperature of from 100° C. to 110° C. as compared with the method of the prior art (Control C) where all of the ingredients are mixed at 27° C. and then heated.

Obviously, other modifications and variations of the present invention are possible in light of the above teachings. It is, therefore, to be understood that changes may be made in the particular embodiments of this invention described which are within the full intended scope of the invention as defined by the appended claims.

What is claimed is:

1. In a method of producing an acylated derivative of an epoxy fatty acid ester or epoxy natural oil having aliphatic chains of 10 to 24 carbon atoms and including at least one oxirane segment per molecule, by reacting said epoxy fatty acid ester or epoxy natural oil with a vinyl aliphatic monocarboxylic acid in contact with 0.10 to 5.0 parts of an acylation catalyst, per 100 parts of reaction mixture, a polymerization inhibitor and gaseous oxygen, the improvement which comprises:
   (A) the addition of said monocarboxylic acid to a reaction mixture comprising the epoxy fatty acid ester or epoxy natural oil, acylation catalyst, polymerization inhibitor and gaseous oxygen; or
   (B) the addition of said acylation catalyst to a reaction mixture comprising the epoxy fatty acid ester or epoxy natural oil, said monocarboxylic acid, polymerization inhibitor and gaseous oxygen; or
   (C) the addition of a mixture of said monocarboxylic acid and said acylation catalyst to a reaction mixture comprising the epoxy fatty acid ester or epoxy natural oil, polymerization inhibitor and gaseous oxygen, said addition being made at a temperature of from about 100° C. to about 125° C., and maintaining the reaction temperature from about 105° C. to about 130° C. for a period of time sufficient to complete the acylation reaction.

2. A method as claimed in claim 1, wherein said monocarboxylic acid is added to a reaction mixture comprising the epoxy fatty acid ester or epoxy natural oil, acylation catalyst, polymerization inhibitor and gaseous oxygen.

3. A method as claimed in claim 1, wherein said acylation catalyst is added to a reaction mixture comprising the epoxy fatty acid ester or epoxy natural oil, said monocarboxylic acid, polymerization inhibitor and gaseous oxygen.

4. A method as claimed in claim 1, wherein the mixture of said monocarboxylic acid and acylation catalyst is added to a reaction mixture comprising the epoxy fatty acid ester or epoxy natural oil, polymerization inhibitor and gaseous oxygen.

5. A method as claimed in claim 1, wherein the said addition occurs at a temperature of from about 105° C. to about 125° C.

6. A method as claimed in claim 1, wherein said epoxy natural oil is linseed oil epoxide.

7. A method as claimed in claim 1, wherein said epoxy natural oil is soybean oil epoxide.

8. A method as claimed in claim 1, wherein said monocarboxylic acid is acrylic acid.

9. A method as claimed in claim 1, wherein said monocarboxylic acid is methacrylic acid.

10. A method as claimed in claim 1, wherein said monocarboxylic acid is acrylic acid and said epoxy natural oil is linseed oil epoxide.

11. A method as claimed in claim 1, wherein said monocarboxylic acid is methacrylic acid and said epoxy natural oil is linseed oil epoxide.

12. A method as claimed in claim 1, wherein said monocarboxylic acid is acrylic acid and said epoxy natural oil is soybean oil epoxide.

13. A method as claimed in claim 1, wherein said monocarboxylic acid is methacrylic acid and said epoxy natural oil is soybean oil epoxide.

14. A method as claimed in claim 1, wherein said acylation catalyst is present in amounts of from 0.3 to 1.5 parts of catalyst, per 100 parts of reaction mixture.

* * * * *